(12) United States Patent
Tan

(10) Patent No.: US 8,466,934 B2
(45) Date of Patent: Jun. 18, 2013

(54) TOUCHSCREEN INTERFACE

(76) Inventor: Min Liang Tan, Singapore (SG)

( * ) Notice: Subject to any disclaimer, the term of this patent is extended or adjusted under 35 U.S.C. 154(b) by 0 days.

(21) Appl. No.: 12/459,248

(22) Filed: Jun. 29, 2009

(65) Prior Publication Data

US 2010/0328351 A1    Dec. 30, 2010

(51) Int. Cl.
*G09G 5/00* (2006.01)
*G06F 3/0481* (2006.01)
*G06F 3/0488* (2006.01)
*G06T 11/60* (2006.01)
*G06T 3/40* (2006.01)

(52) U.S. Cl.
CPC ............ *G06F 3/0481* (2013.01); *G06F 3/0488* (2013.01); *G06T 11/60* (2013.01); *G06T 3/40* (2013.01)
USPC ............................. 345/660; 345/173; 345/661

(58) Field of Classification Search
CPC ......... G06F 3/0481; G06F 3/0488; G06T 3/40; G06T 11/60
USPC .......................................... 345/173, 660–661
See application file for complete search history.

(56) References Cited

U.S. PATENT DOCUMENTS

| | | | | |
|---|---|---|---|---|
| 2004/0160458 A1* | 8/2004 | Igarashi et al. | ................ | 345/660 |
| 2008/0046425 A1* | 2/2008 | Perski | ................ | 707/6 |
| 2008/0165140 A1* | 7/2008 | Christie et al. | ................ | 345/173 |
| 2009/0228841 A1* | 9/2009 | Hildreth | ................ | 715/863 |
| 2009/0237371 A1* | 9/2009 | Kim et al. | ................ | 345/173 |
| 2009/0237421 A1* | 9/2009 | Kim et al. | ................ | 345/661 |
| 2009/0254855 A1* | 10/2009 | Kretz et al. | ................ | 715/800 |
| 2009/0315848 A1* | 12/2009 | Ku et al. | ................ | 345/173 |

* cited by examiner

*Primary Examiner* — Jin-Cheng Wang
(74) *Attorney, Agent, or Firm* — Axis Intellectual Capital PTE Ltd.; Leif R. Sloan; Sonya C. Harris

(57) ABSTRACT

A user interface including a display screen and an input device. The input device is for example a touchscreen, a touch pad, and one or more proximity sensors. The input device detects an input event, more specifically a pointing object placed in proximity therewith. Parameters of the input event include distance of the pointing object from the input device, speed of displacement of the pointing object towards the input device, direction of displacement of the pointing object towards the input device, and direction of displacement of the pointing object relative a plane of the input device. The display screen effects output events or magnification events. A field of view on the display screen (i.e. an area on the display screen) is magnified. At least one of scale of magnification, size of field of view to be magnified and size of resultant magnified field of view is dependent on at least one of the parameters of the input event. A user interface method for controlling magnification events effected by the display screen in response to signals generated by the input device is also provided by the present disclosure.

32 Claims, 6 Drawing Sheets

TOUCHSCREEN INTERFACE

FIELD OF INVENTION

The present disclosure relates generally to touchscreen technologies for electronic devices. More specifically, the present disclosure relates to touchscreen technologies implemented in portable electronic devices for translating input events into controlled magnification of images displayed on a display screen.

BACKGROUND

The use of touchscreen interfaces is increasingly popular with illustrative electronic computing devices such as tablets, personal digital assistants (PDAs), handheld audio and video control systems, portable music and video players as well as mobile and satellite telephones. This is mainly because of the ease of use, versatility of operation, and enhanced aesthetics of touchscreen interfaces. Touchscreen interfaces typically comprise a touch sensitive surface (which can be referred to as a touchscreen) and a display screen. The touch sensitive surface or touchscreen typically overlays, or is coextensive with, a specified portion of the display screen.

At present, a number of touchscreen technologies have been implemented with touchscreen interfaces to enable such touchscreen interfaces to determine one or more of presence, location, and motion of one or more objects, for example fingers, styli, and touch pens. Types of touchscreen technologies include resistive, capacitive, inductive, optical (IR), and acoustic technologies.

The touchscreen interface typically serves as a user interface, or means by which a user of the electronic device interacts with the electronic computing device. The touchscreen of the touchscreen interface serves as an input means of the electronic computing device for receiving input events (e.g., for enabling the user to enter instructions into the touchscreen). The touchscreen is typically capable of detecting or registering pointing objects placed either in proximity with the touchscreen or directly in contact with the touchscreen (i.e. input events). The detection of input events by the touchscreen triggers generation of input signals. Input signals are translated into output signals for producing output events that are effected by output devices of the electronic computing device, for example by the display screen.

The touchscreen interfaces of illustrative electronic computing devices are becoming increasingly smaller in size. Consequently, text, cursors, graphics, and icons displayed on the display screen are also becoming smaller in size. It is generally difficult to reduce the area of touch of the pointing object relative to the text, cursors, graphics, and icons displayed on the display screen. Consequently, it has become increasingly difficult to accurately move and/or select a desired specific cursor or icon displayed on the display screen of the touchscreen interface.

The positioning of the pointing object onto, or even in proximity with, the touchscreen of the touchscreen interface typically significantly obscures the field of view of that area on the touchscreen that the pointing object comes into contact with or is in proximity with. This may result in difficulties for the user to accurately view, move, or select a particular cursor or icon displayed by the display screen corresponding to said area on the touchscreen. In addition, the decreasing sizes of graphics and icons that are currently being displayed can result in difficulty for the user to view and/or select such graphics and icons, especially when the user needs to do so at a rapid speed.

There exist touchscreen technologies that enable the user to magnify a specified area on touchscreen interfaces upon detection of touch by the finger, stylus, or alternative pointing object. U.S. patent application Ser. No. 11/240,788 of Apple Computer Inc. discloses proximity based systems and methods capable of sensing objects positioned on, and/or in close proximity to, a display surface of an electronic device. The U.S. patent application Ser. No. 11/240,788 further discloses the ability to expand an area of graphical information proximate the position of the object when the object is detected in space above the display surface. However, there exist several limitations to the systems and methods disclosed by U.S. patent application Ser. No. 11/240,788. For example, it is said to be difficult to control the sensing or detection of the object. Accordingly, it may be difficult to prevent accidental or unwanted activation and magnification of areas of the display surface. In addition, it is not possible with the systems or methods disclosed by U.S. patent application Ser. No. 11/240,788 to dynamically control the magnification of images displayed on the display screen.

There therefore exists a need for improving touchscreen or the like interfaces incorporated within electronic computing devices.

SUMMARY

In accordance with a first aspect of the present disclosure, there is disclosed a user interface method for controlling a magnification event on a display screen in response to input events. The user interface method comprises detecting an input event by the input device and determining at least one of a plurality of parameters of the input event, the plurality of parameters comprising a distance of a pointing object from the input device and a speed of displacement of the pointing object towards the input device. The user interface method further comprises correlating each of the at least one of the plurality of parameters of the input event with at least one of a magnification factor, a field of view size, and a size of a resultant magnified field of view for the magnification event.

In accordance with a second aspect of the present disclosure, there is disclosed a touchscreen interface method for controlling a magnification event of a display screen in response to at least one parameter of an input event. The touchscreen interface method comprises detecting a pointing object in proximity with the touchscreen and determining at least one of a plurality of parameters of the input event, the plurality of parameters comprising distance of the pointing object from the touchscreen and speed of displacement of the pointing object towards the touchscreen. The touchscreen interface method further comprises determining at least one of a magnification factor, a field of view size, and a size of a resultant magnified field of view for the magnification event, the at least one of the magnification factor, the field of view size, and the size of the resultant magnified field of view being determined in correlation to the at least one of the plurality of parameters of the input event.

In accordance with a third aspect of the present disclosure, there is disclosed a user interface method for controlling a parameter of a magnification event on a display screen in response to an input event. The user interface method comprises determining at least one of a plurality of parameters of the input event, the plurality of parameters of the input event comprising distance of the pointing object from the touchscreen, speed of displacement of the pointing object towards the touchscreen, direction of displacement of the pointing object towards the touchscreen, and direction of displacement of the pointing object parallel a plane of the touchscreen. The user interface method further comprises correlating at least one parameter of the magnification event to the at least one of the plurality of parameters of the input event, the at least parameter of the magnification event being selected from a group comprising a magnification factor, a field of view size, and a size of a resultant magnified field of view of the magnification event.

In accordance with a fourth aspect of the present disclosure, there is disclosed a user interface comprising a proximity sensor for detecting a pointing object in proximity thereto and generating input signals. The input signals when processed provides information on at least one of distance of the pointing object from the touchscreen, speed of displacement of the pointing object towards the touchscreen, direction of displacement of the pointing object towards the touchscreen, and direction of displacement of the pointing object parallel a plane of the touchscreen. The electronic device further comprises a display screen in signal communication with the proximity sensor for effecting a magnification event. The magnification event has at least one parameter that corresponds to at least one of the distance of the of the pointing object from the touchscreen, the speed of displacement of the pointing object towards the touchscreen, the direction of displacement of the pointing object towards the touchscreen, and the direction of displacement of the pointing object parallel the plane of the touchscreen. The at least one parameter is selected from one of a scale of magnification of the magnification event, a size of field of view for the magnification event, and a size of a magnified field of view.

In accordance with a fifth aspect of the present disclosure, there is disclosed an electronic device comprising a touchscreen capable of detecting a pointing object in proximity thereto for generating input signals and a processor for receiving the input signals from the touchscreen and processing the input signals for determining at least one of distance of the pointing object from the touchscreen and speed of displacement of the pointing object towards the touchscreen. The user interface further comprises a display screen for effecting a magnification event, the magnification event having at least one parameter that correlates to at least one of the distance of the pointing object from the touchscreen and the speed of displacement of the pointing object towards the touchscreen. The at least one parameter is one of a scale of magnification of the magnification event, a size of field of view for the magnification event, and a size of a magnified field of view.

In accordance with a sixth aspect of the present disclosure, there is disclosed an input device comprising at least one sensor for detecting an input event and generate input signals and a module for processing the input signals to determine at least one of a plurality of parameters of the input event. The plurality of parameters comprises a distance of the pointing object from the at least one sensor, a speed of displacement of the pointing object towards the at least one sensor, a direction of displacement of the pointing object towards the at least one sensor, and a direction of displacement of the pointing object relative the at least one sensor. The module also correlates the at least one of the plurality of parameters of the input event with at least one of a plurality of parameters of a magnification event performed by a display screen. The plurality of parameters of the magnification event comprises a scale of magnification, a size of field of view for the magnification event, and a size of a magnified field of view.

BRIEF DESCRIPTION OF THE DRAWINGS

Embodiments of the present disclosure are described herein with reference to the drawings, in which.

DETAILED DESCRIPTION

Figure 1:
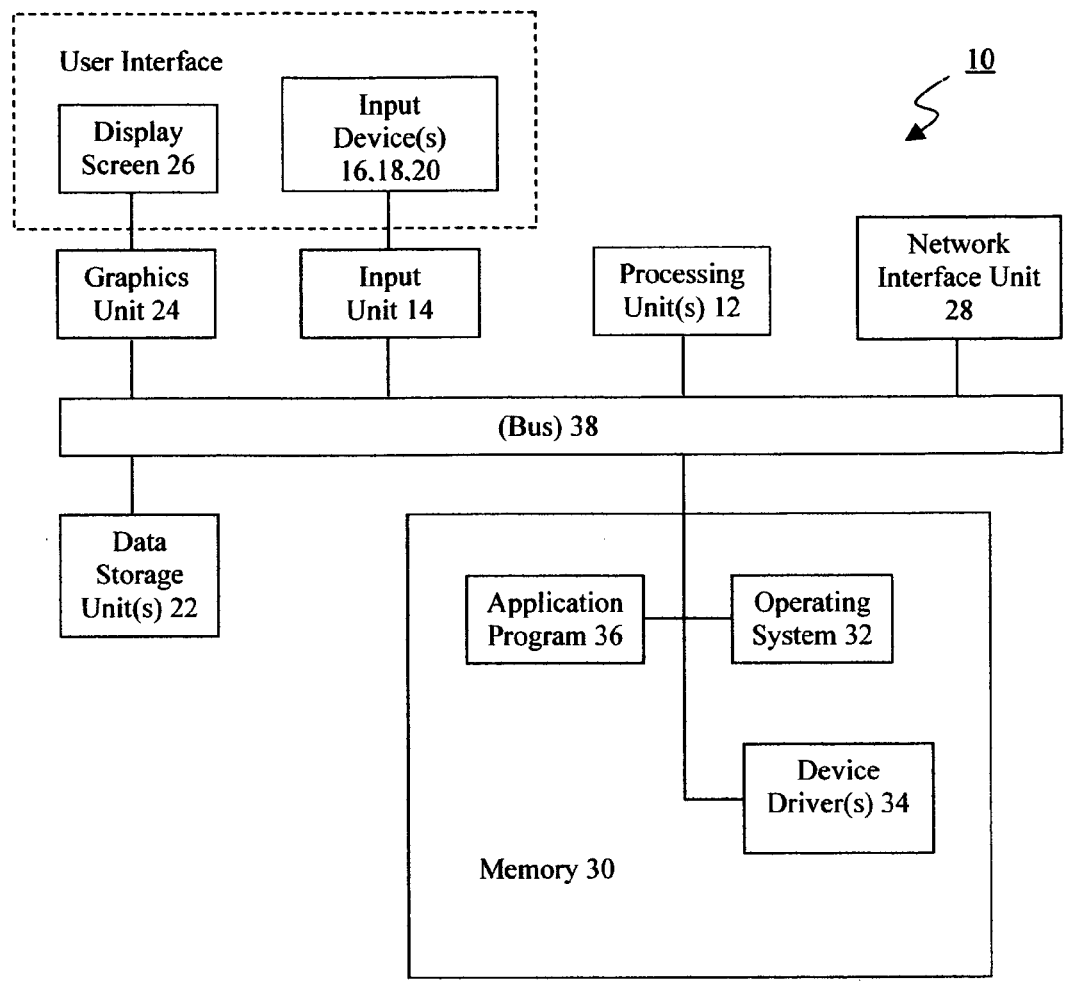
FIG. 1 is a block diagram of an electronic computing system incorporating a user interface according to several embodiments of the present disclosure.

Touchscreen technologies are commonly integrated in illustrative electronic computing devices, for example tablets, personal digital assistants (PDAs), audio and video control systems, portable music, video players, as well as mobile and satellite telephones. Such electronic computing devices include a touchscreen interface, which serves as a user interface. The touchscreen interface includes a touch sensitive surface (hereinafter referred to as a touchscreen), and a display screen. The touchscreen overlays a specified portion of the display screen.

Conventional touchscreen technologies can enable a user of the electronic computing device to expand an area of graphical and/or text information displayed on the display screen upon detection or registration of a touch event by the touchscreen. However, there are limitations to conventional touchscreen technologies. For example, conventional touchscreen technologies do not enable the user to actively control scale of magnification (or magnification factor) of a magnified area based on distance of the object from the touchscreen. In addition, conventional touchscreen technologies do not enable the user to actively control the size of the magnified area based on distance of the object from the touchscreen.

Various exemplary embodiments of the present disclosure are directed to systems, devices, methods, processes, procedures, and/or techniques for providing enhanced user interfaces. Embodiments of the present disclosure involve manipulating or controlling at least one of scale of magnification (i.e., magnification factor), size of a field of view to be magnified on the display screen, and size of a magnified area displayed on the display screen. More specifically, various embodiments of the present disclosure relate to systems, devices, user interfaces, methods, processes, procedures, and/or techniques for enabling control of at least one of scale of magnification, size of a field of view to be magnified on the display screen, and size of a magnified area displayed on the display screen based on at least one of distance of a pointing object from the touchscreen, speed of displacement of the pointing object towards the touchscreen, direction at which the pointing object is displaced towards the touchscreen, and direction of movement of the pointing objective along a plane of the touchscreen.

For simplicity and clarity of illustration, the exemplary embodiments of the present disclosure are described hereinafter with reference to FIG. 1 to FIG. 6, in which like elements are numbered with like reference numerals. Specific details of the described embodiments may be set forth to provide a thorough understanding of the exemplary embodiments of the present disclosure. However, it can be understood by a person skilled in the art that the exemplary embodiments of the present disclosure described herein are not precluded from other applications where fundamental principles prevalent among the various exemplary embodiments of the present disclosure such as operational, functional or performance characteristics are required.

As described in detail below, various embodiments of the present disclosure involve an electronic computing device with a user interface. Examples of electronic computing devices include portable game consoles, digital cameras, and mobile, or handheld, wireless communication devices such as pagers, cellular phones, cellular smart-phones, wireless organizers, personal digital assistants, wirelessly enabled notebook computers, and the like devices. The user interface registers or detects input events via an input device and effects output events via a display screen. The input device is for example a touchscreen, a touch pad, and one or more proximity detectors. In most embodiments of the present disclosure, the input device detects pointing object(s) such as fingers, stylus, and touch pens positioned in proximity to the input device. Magnification of a specified area of graphical and/or text information presented by the display screen is effected subsequent the detection of the pointing object(s) by the input device. Parameters of the output events effected by the display screen, more specifically, parameters of the magnification event effected by the display screen (i.e. magnification of a field of view on the display screen) are dependent on parameters of the input events detected by the input device. In several embodiments of the present disclosure, at least one of scale of magnification, size of field of view to be magnified on the display screen, and size of the magnified field of view, is determined based on a formula involving at least one of distance of the pointing object(s) from the input device, speed of displacement of the pointing object(s) towards the input device, direction at which the pointing object is displaced towards the input device, and direction of movement of the pointing objective along a plane of the input device.

FIG. 1 illustrates a representative electronic computing system 10 incorporating a user interface in accordance with embodiments of the present disclosure.

Figure 2:
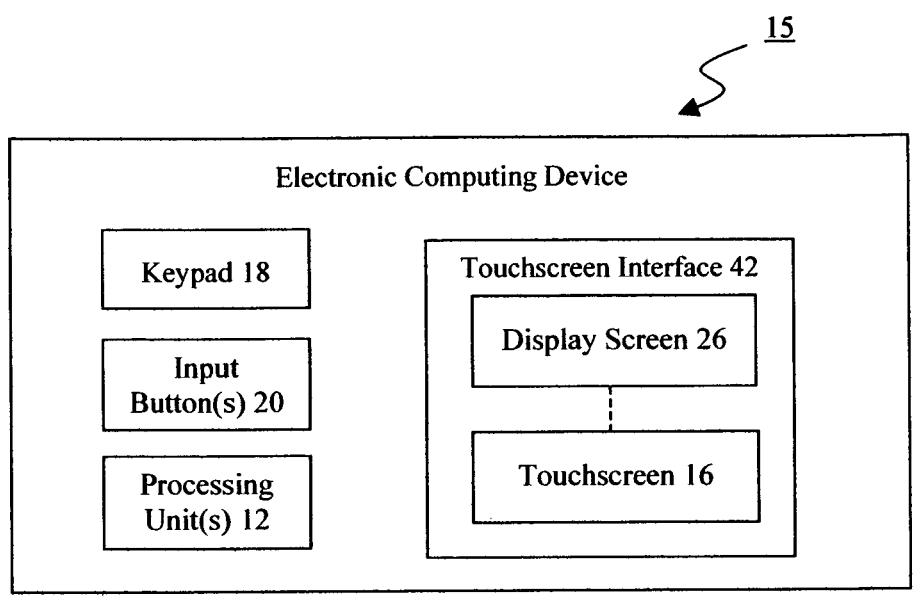
FIG. 2 is a schematic illustration of a representative electronic computing device incorporating a touchscreen interface according to certain embodiments of the present disclosure.

The electronic computing system 10 shown in FIG. 1 is present in or used with personal computers, and particular personal digital assistants (PDAs). The electronic computing system 10 includes a processing unit 12; an input unit 14 coupled to one or more input devices such as a touchscreen 16, a keypad 18, and one or more input buttons 20 (such input devices are shown in FIG. 2); a data storage unit 22; a graphics unit 24 coupled to a display screen 26; and a network interface unit 28, which connects the electronic computing device 10 to the a telecommunications station, and/or a computer network such as a Local Area Network (LAN), a Wide Area Network (WAN), and/or the Internet. The electronic computing system 10 further includes a memory 30 in which an operating system 32, a set of device drivers 34, and one or more portions of an application program reside 36. Finally, the electronic computing system 10 includes at least one bus 38 to which each element of the electronic computing system 10 is coupled to facilitate the communication or exchange of control signals and data. It can be understood by a person skilled in the art that the architecture of the electronic computing system 10 as shown in FIG. 1 can be altered as required. For example, not all components of the electronic computing system 10 are present in several embodiments of the present disclosure.

The processing unit 12 includes one or more processors (e.g., at least one microprocessor and/or microcontroller) capable of executing stored program instructions. The data storage unit 22 includes one or more types of fixed and/or removable data storage devices or elements, as well as storage media corresponding thereto. For instance, the data storage unit 22 can include a hard disk drive, a DVD or CD-ROM drive, and/or a USB flash drive. The memory 30 includes one or more types of volatile and/or nonvolatile memory, such as a register set, Random Access Memory (RAM), and Read Only Memory (ROM). Portions of the data storage unit 22 and/or the memory 30 can form one or more computer programmable or readable media on which portions of an application program, and/or program instructions of one or more device drivers 34, according to embodiments of the present disclosure reside.

Figure 3:
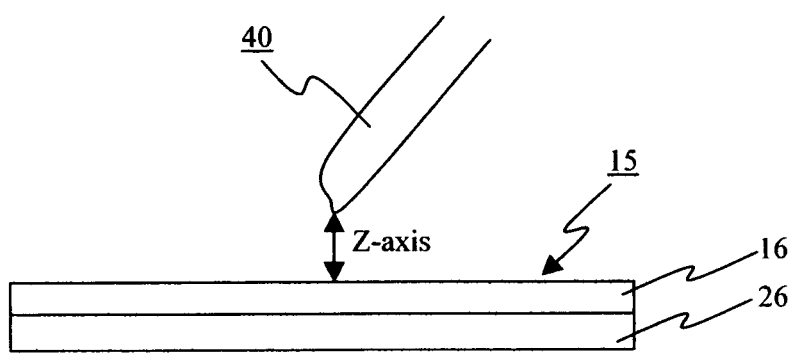
FIG. 3 shows a partial side view of the representative electronic computing device of FIG. 2 with a pointing object placed in proximity thereto.

FIG. 2 and FIG. 3 show an electronic computing device 15 according to several embodiments of the present disclosure. In several embodiments of the present disclosure, the electronic computing device 15 of FIG. 2 includes the components of the electronic computing system 10 as shown in FIG. 1. The electronic computing device 15 includes or incorporates a touchscreen interface 42, which functions as a user interface. The touchscreen interface 42 includes the touchscreen 16 and the display screen 26. The touchscreen 16 overlays at least part of the display screen 26. It, is possible in other embodiments of the present disclosure that the touchscreen 16 is substituted with a touch pad or a like proximity-detecting device that is positioned at a different location from the display screen 26. The touchscreen 16 functions as an input means for the electronic computing device 15, and accordingly registers input events. In several embodiments of the present disclosure, the touchscreen 16 detects or registers pointing object(s) 40 positioned in proximity with (i.e., at a distance from) the touchscreen 16. In some embodiments of the present disclosure, the touchscreen 16 also registers pointing object(s) 40 positioned in direct physical contact with the touchscreen 16. The display screen 26 effects output events of the electronic computing device 15. The display screen 26 displays graphical and/or text information to the user of the electronic computing device 15. Typically, the display screen 26 uses one of light emitting diodes (LEDs), cathode ray tube (CRT), and plasma display technology for displaying the graphical and/or text information to the user. In several embodiments of the present disclosure, output events are magnification events that involve magnification of a field of view (i.e. an area of graphical and/or text information) on the display screen 26.

The touchscreen 16 can utilize a number of touchscreen sensing technologies for receiving input events (i.e., for detecting or registering pointing object(s) 40). Touchscreen sensing technologies include, but are not limited to, capacitive, resistive, projected capacitance, optical (infrared), electric field, inductive, surface acoustic wave, and acoustic emission technologies. Descriptions of a number of exemplary touchscreen sensing technologies are provided below. However, a person skilled in the art can understand that any combination of the described touchscreen sensing technologies may be used. In addition, other touchscreen sensing technologies and proximity sensing technologies that are not described herein may also be used with the touchscreen 16.

Capacitive Touchscreen Technology

A capacitive touchscreen is coated with a material, for example indium tin oxide, which conducts a continuous electrical current above the touchscreen. The touchscreen achieves capacitance, or exhibits a precisely controlled field of stored electronic in both the horizontal and vertical axes of the touchscreen. The capacitive touchscreen detects or registers a pointing object positioned in proximity, or in contact, therewith by detecting changes in capacitance adjacent the capacitive touchscreen. The pointing object does not need to make physical contact with the capacitive touchscreen in order to be detected by the capacitive touchscreen. The pointing object must exhibit capacitance to be detected by the capacitive touchscreen. Examples of pointing objects capable of use with the capacitive touchscreen include fingers and a conductive pen stylus.

Optical Infrared Touchscreen Technology

A touchscreen utilizing or incorporating optical infrared technology includes an array of infrared (IR) light emitting diodes (LEDs) positioned at two adjacent bezel edges of the touchscreen, and photosensors positioned at two opposite bezel edges of the touchscreen. The IR-LEDs and photosensors together form a grid of IR light beams across the surface of the touchscreen. The IR-LEDs emits pulses of IR light beams that are detected by the photosensors. When an pointing object is positioned in proximity, or in physical contact, with the touchscreen, the IR beams are interrupted, resulting in a measurable decrease in light detected by the photosensors. The measurable decrease in light detected by the photosensors is processed for locating the pointing object (i.e., determining coordinates of the pointing object with respect to the touchscreen).

In various embodiments of the present disclosure including that shown in FIG. 2, the input unit 14 of the electronic computing device 15 is coupled to one or more other input devices besides the touchscreen 16, for example the keypad 18, and the input buttons 20. Having multiple input devices provides the electronic computing device 15 with multiple input options. Each input device receives input events and generates corresponding input signals that are then transmitted to the processing unit 12 (i.e., a module of the electronic computing device 15 for processing input signals) via the bus 38. The processing unit 12 processes the input signals for determining parameters, characteristics, and properties of the corresponding input events (i.e., data relating to the corresponding input events). The processing unit 12 generates output data, which is transmitted to one or more output devices for producing output events. The processing unit 12 is capable of simultaneously processing multiple input signals (generated by multiple input events) transmitted to the processing unit 12 from multiple input devices.

In several embodiments of the present disclosure, application programs, configuration settings, and/or program instructions that control translation of input events to output events can be stored in memory locations and/or a file residing on the data storage unit 22. More specifically, the application programs, program instructions, and/or configuration settings facilitate correlation between input events detected by the touchscreen 16 (and corresponding signals generated by these input events) and output events effects by the display screen 26. Such application programs, program instructions, and/or configuration settings can be modified (i.e., (re)configured or (re)programmed) as required by the user of the electronic computing device 15.

In various embodiments of the present disclosure, the touchscreen 16 is capable of detecting pointing object(s) 40 positioned in direct physical contact with the touchscreen 16 (i.e., input event being physical contact of pointing object(s) 40 with the touchscreen 16). In several embodiments of the present disclosure, the touchscreen 16 is further capable of detecting pointing object(s) 40 positioned in proximity with the touchscreen 16 (i.e., input event being detection of pointing object(s) 40 in proximity with the touchscreen 16). In addition, the touchscreen driver can be configured or programmed for selecting or setting an initiation distance (also referred to as a first reference distance). The initiation distance or first reference distance is the distance from the touchscreen 16 at which the pointing object(s) 40 is first detectable by the touchscreen 16.

As mentioned in the foregoing, the processing unit 12 is capable of processing input signals for determining parameters, characteristics, or properties of the input events (i.e., for determining a set of data corresponding to the input event). In various embodiments of the present disclosure, the electronic computing device 15 is capable of determining distance (i.e., Z-axis distance) of the pointing object(s) 40 from the touchscreen 16. The Z-axis is defined by a perpendicular line between the pointing object(s) 40 positioned in proximity with the touchscreen 16 and the touchscreen 16. In other embodiments of the present disclosure, the electronic computing device 15 can further determine at least one of speed of displacement of the pointing object(s) 40 towards the touchscreen 16, location of the pointing object(s) 40 relative the touchscreen 16, direction of approach of the pointing object(s) 40 displaced towards the touchscreen 16, and X-Y displacement of the pointing object(s) 40 along a plane of the touchscreen 16 (i.e. a surface of the touchscreen 16).

In several embodiments of the present disclosure, program instructions and/or configuration data of the touchscreen driver at least partially controls the processing of the input signals from the touchscreen 16 by the processing unit 12. In various embodiments, other application programs and/or program instructions are involved in the processing of input signals received from the touchscreen 16 by the processing unit 12.

In most embodiments of the present disclosure, the processing unit 12 processes the input signals for determining distance of the pointing object(s) 40 from the touchscreen 16. In several embodiments of the present disclosure, the processing unit 12 processes the input signals for further determining at least one of speed of approach of the pointing object(s) 40 towards the touchscreen 16, location of the pointing object(s) 40 relative the touchscreen 16, direction of approach of the pointing object(s) 40 relative the touchscreen 16, and X-Y displacement of the pointing object(s) 40 relative a plane of the touchscreen 16.

Figure 4A:
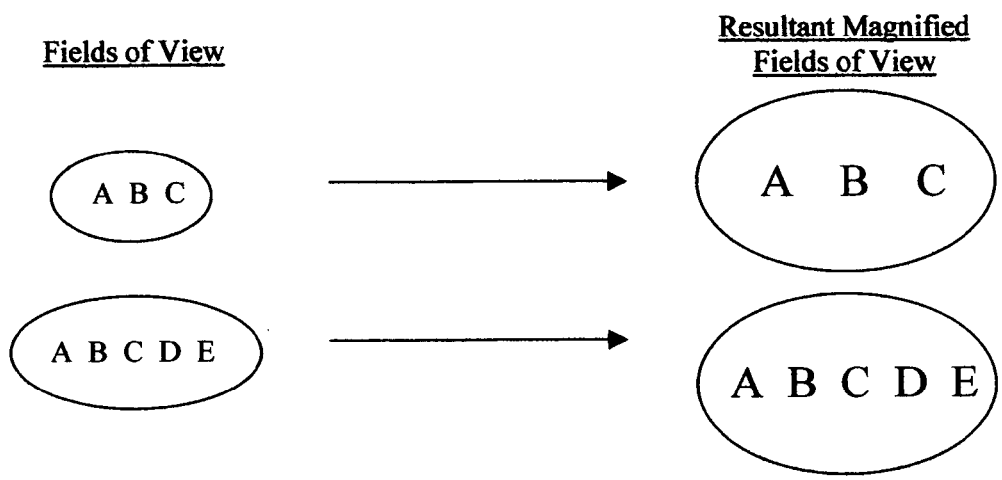
FIG. 4a illustrates different field of view sizes being magnified on a display screen.
Figure 4B:
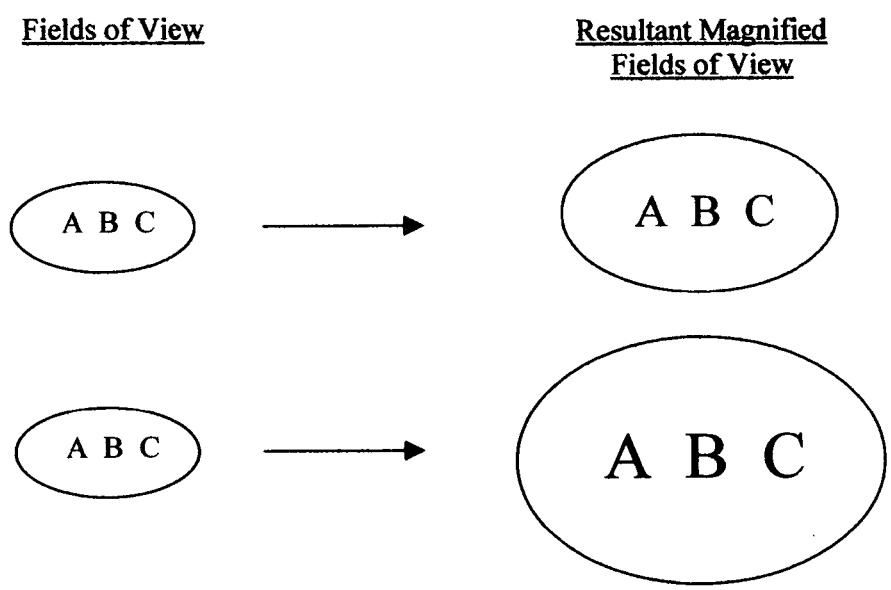
FIG. 4b illustrates different sizes of resultant magnified fields of view on the display screen.

The processing unit 12 translates input signals into output data, or output signals, which are sent to the display screen 26 for effecting or facilitating output events. The parameters, characteristics, or properties of the input events are used for determining parameters, characteristics, or properties of the output events. This means that data relating to the input events are used for determining or generating data related to the output events. Where the output event is a magnification event (i.e., magnification of an area displayed on the display screen 26), the parameters, characteristics, or properties of the magnification event include magnification factor, size of field of view for magnification (different field of view sizes are illustrated in FIG. 4a), and size of the resultant magnified field of view (different sizes of the resultant magnified field of view are illustrated in FIG. 4b). Application programs, configuration settings, and/or program instructions facilitate the translation or correlation between input events of the touchscreen 16 (and input signals generated by such input events) and output data for producing corresponding output events, more specifically magnification events, effected by the display screen 26.

As mentioned in the foregoing, output event of several embodiments of the present disclosure is the magnification event that involves magnification of an area of graphical and/or text information displayed by the display screen 26. The area of graphical and/or text information to be/being magnified on the display screen 26 is referred to as a field of view. In various embodiments of the present disclosure, the output data specifies location of the magnified field of view. The location of the magnified field of view on the display screen 26 corresponds to position of the pointing object(s) 40 relative the touchscreen 16 in most embodiments of the present disclosure. In various embodiments of the present disclosure, the magnified field of view follows the pointing object 40 as the pointing object 40 is displaced along the plane of the touchscreen 16. In other embodiments of the present disclosure, the field of view on the display screen 26 is dynamically selected and changes in correlation with displacement of the pointing object 40 along the plane of the display screen 26. In various embodiments of the present disclosure, output data specifies size of the field of view to be magnified. In several embodiments of the present disclosure, the output data further specified the size of the magnified field of view (i.e. resultant size of the magnified field of view). In several embodiments of the present disclosure, the output data further specifies shape of the field of view. In some embodiments of the present disclosure, the output data further dictate scale of magnification or magnification factor of the field of view.

A range of sizes of the field of view to be magnified, a range of sizes for resultant magnified field of views, as well as a range of scales of magnification can be pre-determined, pre-programmed, and stored in the data storage unit 22. Selection of each of size of field of view to be magnified, size of resultant magnified field of view, and scale of magnification of the magnification event (i.e. parameters of the magnification event) can be determined based on parameters of the input event as determined by the processing unit 12. In some embodiments of the present disclosure, selection of each of size of field of view to be magnified, size of resultant magnified field of view, and scale of magnification can be influenced by input signals received from other input devices (i.e., by input events detected by other input devices).

In various embodiments of the present disclosure, the output data generated from input signals received from the touchscreen 16 further facilitates freezing, and/or subsequent unfreezing, of the magnified field of view. In most embodiments of the present invention, freezing and/or unfreezing of the magnified field of view is at least partly dependent on distance of the pointing object(s) 40 from the touchscreen 16.

In various embodiments of the present disclosure, the output data is further generated in response to other input signals that are received from other input devices besides the touchscreen 16 (e.g., input signals received from the keypad 18 or the input buttons 20). For example, freezing and/or unfreezing of the magnified field of view can be at least partly dependent upon actuation of the keypad 18 or input button 20 of the electronic computing device 15.

As in the foregoing, the touchscreen interface 42 of the electronic computing device 15 according to embodiments of the present disclosure facilitates control of magnification of predetermined areas of graphical and/or text information displayed on the display screen 26 (i.e. field of views on the display screen). The functionality of magnifying said field of views on the display screen 26 increases ease of viewing, and selection of, icons within the resultant magnified field of view on the display screen 26.

For purposes of brevity and clarity, various embodiments of the present disclosure described below relate to methods and processes involving the use of the touchscreen interface 42 as a main or key user interface of the electronic computing device 15. The touchscreen interface 42 comprises the touchscreen 16 and the display screen 26. It can be understood by a person skilled in the art that the touchscreen interface 42 can be substituted with an alternative type of user interface involving touch pads or proximity sensor(s) as the input device(s).

Figure 5:
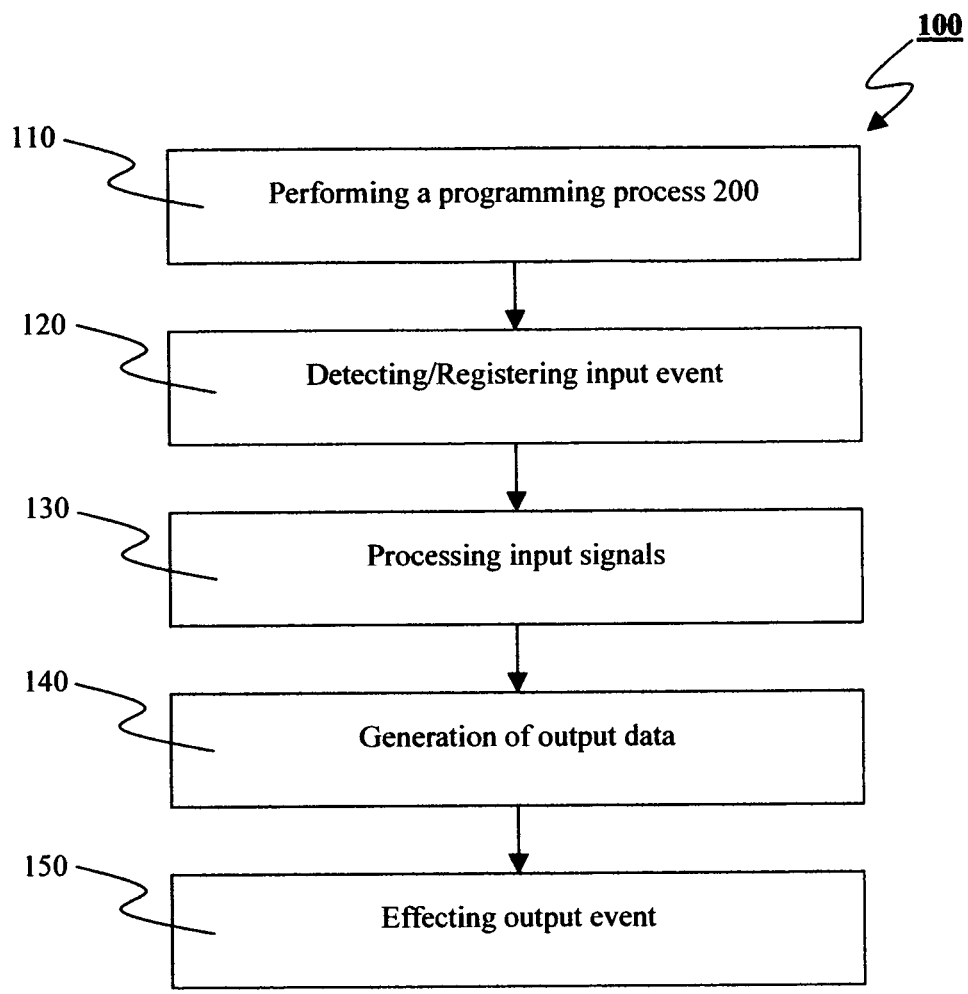
FIG. 5 is a flow diagram of a user interface method according to an embodiment of the present disclosure.

FIG. 5 is a flowchart of a touchscreen interface method 100 (or user interface method) according to an embodiment of the present disclosure. A first method step 110 of the touchscreen interface method 100 involves performance of a programming or a setup process 200 provided by embodiments of the present disclosure. The programming process 200 involves creating and storing of a touchscreen interface program application (i.e., a set of program instructions for the touchscreen interface 42). The touchscreen interface program application can include at least part of touchscreen driver configuration settings. The touchscreen interface program application controls translation of input events detected by the touchscreen 16 into output events, more specifically magnification events, effected by the display screen 26.

In a second method step 120, an input event is detected or registered by the touchscreen 16. In several embodiments of the present disclosure, the input event involves detection of the pointing object(s) 40 by the touchscreen 16. More specifically, the input event involves detection of the pointing object(s) 40 positioned in proximity with (i.e., at a distance from) the touchscreen 16. Detection of the input event triggers generation of input signals by the touchscreen 16. The input signals are transmitted to the processing unit 12 via the bus 38.

Input signals are processed by the processing unit 12 in a third method step 130 of the touchscreen interface method 100. The processing of the input signals enables determination of data related to the input event (i.e. parameters, characteristics, or properties of the input event). In some embodiments of the present disclosure, the processing of input signals enables determination of distance of the pointing object(s) 40 from the touchscreen 16. In various embodiments of the present disclosure, the third method step further involves determination of speed of approach or displacement of the pointing object(s) 40 towards touchscreen 16. In more embodiments of the present disclosure, the third method step further involves determination of direction of displacement of the pointing object(s) 40 towards the touchscreen and/or direction of displacement of the pointing object(s) 40 along a plane of the touchscreen 16. Determination of parameters of the input events facilitates selection or generation of output data in a fourth method step 140. In embodiments of the present disclosure, the output data is generated in consideration of the processed input signals. A fifth method step 150 of the touchscreen interface method 100 involves transmission of the output data to the display screen 26 for effecting output events, more specifically for effecting magnification events involving magnification of graphical and/or text information displayed by the display screen 26.

Figure 6:
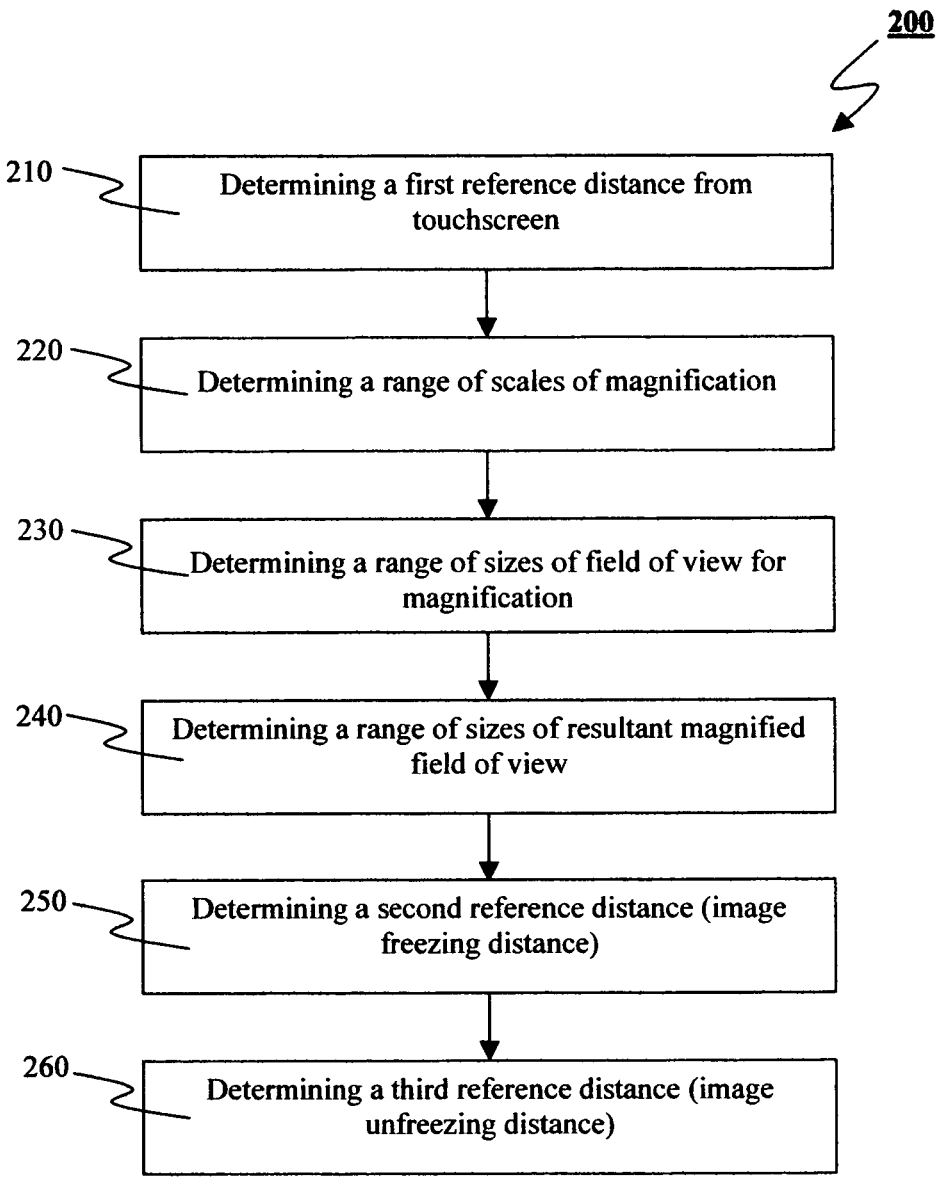
FIG. 6 is a flow diagram of a programming process performed in a method step of the user interface method of FIG. 5.

As mentioned in the foregoing, the first method step 110 of the touchscreen interface method 100 involves performance of a programming process 200 provided by embodiments of the present disclosure. A flowchart of the programming process 200 is shown in FIG. 6.

In a first process portion 210 of the programming process 200, a first reference distance (also known as an initiation distance) from the touchscreen 16 is determined and stored. The first reference distance corresponds to a distance from the touchscreen 16 at which the pointing object(s) 40 can be first detected or registered by the touchscreen 16. The first reference distance can be altered as required by the user. The first reference distance can be altered during normal operation of the electronic computing device 15.

A second process portion 220 of the programming process 200 involves determining and storing a range of scales of magnification or magnification factors, by which the field of view on the display screen 26 can be magnified. In certain embodiments of the present disclosure, each magnification factor within the range of magnification factors is linked to a predetermined distance of the pointing object(s) 40 from the touchscreen 16. Accordingly, the magnification factor of the field of view will be dependent on the distance of the pointing object(s) 40 from the touchscreen 16. In other embodiments of the present invention, each magnification factor within the range of magnification factors is linked to a predetermined speed of approach of the pointing object(s) 40 towards the touchscreen 16. Accordingly, the magnification factor of the field of view will be dependent on the speed of approach of the pointing object(s) 40 towards the touchscreen 16. In yet other embodiments of the present disclosure, each magnification factor of the range of magnification factors is at least partly dependent on one or more other input events (e.g., direction of displacement of the pointing object(s) 40 towards the touchscreen 16, direction of displacement of the pointing object along a plane of the touchscreen 16, an actuation of another input device, and/or selection of an icon displayed on the display screen 26).

In a third process portion 230 of the programming process 200, a range of sizes (i.e., areas) of the field of view is determined and stored. In various embodiments of the present disclosure, shape of the field of view can further be determined and stored. The size of the field of view can be defined by a Cartesian coordinate system. More specifically, the size of the field of view can be defined by a value on the X-axis (or horizontal axis) and a value on the Y-axis (or vertical axis) along the plane of the display screen 26. The value on each of the X-axis and the Y-axis is measured from the Z-axis, which is defined by a perpendicular line running between the pointing object 40 and the touchscreen 16. The distance of the pointing object(s) 40 from the touchscreen 16 is a value on the Z-axis.

In certain embodiments of the present disclosure, size of the field of view is linked to a predetermined distance of the pointing object(s) 40 from the touchscreen 16. Accordingly, the size of the field of view is dependent on the distance of the pointing object(s) 40 from the touchscreen 16. In other embodiments of the present invention, size of the field of view is linked to a predetermined speed of approach of the pointing object(s) 40 towards the touchscreen 16. Accordingly, the size of the field of view will be dependent on the speed of approach of the pointing object(s) 40 towards the touchscreen 16. In yet other embodiments of the present disclosure, size of the field of view is at least partly dependent on one or more other input events (e.g., direction of displacement of the pointing object(s) 40 towards the touchscreen 16, direction of displacement of the pointing object(s) 40 along the plane of the touchscreen 16, actuation of another input device, and/or selection of an icon displayed on the display screen 26).

In a fourth process portion 230 of the programming process 200, a range of sizes for resultant magnified field of view is determined and stored. The size of the resultant magnified field of view can be referred to as the size up to which the field of view when magnified reaches. In certain embodiments of the present disclosure, size of the resultant magnified field of view is linked to a predetermined distance of the pointing object(s) 40 from the touchscreen 16. Accordingly, the size of the resultant magnified field of view is dependent on the distance of the pointing object(s) 40 from the touchscreen 16.

In other embodiments of the present invention, size of the resultant magnified field of view is linked to a predetermined speed of approach of the pointing object(s) 40 towards the touchscreen 16. Accordingly, the size of the resultant magnified field of view will be dependent on the speed of approach of the pointing object(s) 40 towards the touchscreen 16. In yet other embodiments of the present disclosure, size of the resultant magnified field of view is at least partly dependent on one or more other input events (e.g., direction of displacement of the pointing object(s) 40 towards the touchscreen 16, direction of displacement of the pointing object(s) 40 along the plane of the touchscreen 16, actuation of another input device, and/or selection of an icon displayed on the display screen 26).

A process portion 250 involves determining a second reference distance (also known as an image freezing distance). The second reference distance corresponds to a distance of the pointing object(s) 40 from the touchscreen 16 at which the resultant magnified field of view on the display screen 26 can be frozen or stilled. In most embodiments, the second reference distance is less than the first reference distance. In some embodiments, the resultant magnified field of view on the display screen 26 is frozen upon occurrence of an additional, or an alternative, input event (i.e., input of another or an alternative input signal), for example actuation of an input button 20. The ability to freeze the resultant magnified field of view enables the user to view a frozen magnified image (i.e., a magnified area of graphical and/or text information) on the display screen 26. This increases ease of viewing of graphical and/or text information displayed on the display screen 26, and/or ease of entering the user's inputs into the electronic computing device 10 via the touchscreen 16 (e.g., selecting an icon found within the resultant magnified field of view).

A process portion 260 involves determining a third reference distance (also known as an image unfreezing distance). The third reference distance corresponds with a distance of the pointing object(s) 40 from the touchscreen 16 at which a frozen magnified field of view can be unfrozen. In some embodiments, unfreezing of the frozen magnified field of view can be effected with another, or an alternative, input event (i.e., with another or an alternative input signal), for example actuation of an input button 20. Each of the second and third reference distance can be varied as required by the user during normal operation of the electronic computing device 10.

It can be understood by a skilled person that the above-described process portions 210 to 260 of the setup process 200 can be (re)arranged as required by the user. In addition, a skilled person will understand that any one or more of the steps 210 to 260 may be modified or eliminated as required by the user.

As described in the foregoing, the second method step 120 of the touchscreen interface method 100 involves the detection or registration of input events. Detection of the input event triggers generation of input signals by the touchscreen 16 that are transmitted to the processing unit via the bus 38. The third method step 130 involves processing of the input signals for determining parameters, characteristics, or properties of the input events.

Output data is generated based on the determined parameters, characteristics, or properties of the input events (i.e. data relating to the input event). In most embodiments of the present disclosure, the output data is dependent on at least one of distance of pointing object(s) 40 from the touchscreen 16, speed of displacement of the pointing object(s) 40 towards the touchscreen 16, direction of displacement of the pointing object(s) 40 towards the touchscreen 16, and direction of displacement of pointing object(s) 40 along the plane of the touchscreen 16. The output data is transmitted to the display screen 26 in the fifth method step 150 for producing corresponding output events, more specifically magnification events. In most embodiments of the present disclosure, the fifth method step 150 involves magnification of an area of graphical and/or text information displayed on the display screen 26 (i.e., field of view on the display screen). Parameters, characteristics, or properties of the output event, more specifically magnification event, are dependent on output data generated by the processing unit, and accordingly on one or more parameters, characteristics, or properties of the input event.

In several embodiments of the present disclosure, the scale of magnification or magnification factor of the magnified area is dependent on one or more of distance of the pointing object(s) 40 from the touchscreen 16, speed of displacement of the pointing object(s) 40 towards the touchscreen 16, and direction at which the pointing object(s) 40 is displaced towards the touchscreen 16, and direction of displacement of the pointing object 40 along the plane of the touchscreen 16 as determined via the processing of the input signals. In some embodiments of the present disclosure, the size of the field of view to be magnified (i.e. for magnification) is dependent on one or more of distance of the pointing object(s) 40 from the touchscreen 16, speed of pointing object(s) 40 displaced towards the touchscreen 16, and direction at which the pointing object(s) 40 is displaced towards the touchscreen 16, and direction of displacement of the pointing object 40 along the plane of the touchscreen 16 as determined via the processing of the input signals. In several embodiments of the present disclosure, the size of resultant magnified field of view is dependent on one or more of distance of the pointing object(s) 40 from the touchscreen 16, speed of pointing object(s) 40 displaced towards the touchscreen 16, and direction at which the pointing object(s) 40 is displaced towards the touchscreen 16, and direction of displacement of the pointing object 40 along the plane of the touchscreen 16 as determined via the processing of the input signals. In several embodiments of the present disclosure, freezing, and subsequent unfreezing of the magnified image is dependent on distance of the pointing object(s) 40 from the touchscreen 16.

Although embodiments of the present disclosure as provided above relate to the touchscreen interface 42, a skilled person can understand that other input events mediated by alternative input devices (e.g. the keypad 18 and the input button 20) to generate corresponding input signals can also be taken into consideration for controlling one or more of the parameters, characteristics, or properties of the output event.). For example, at least one of scale of magnification, size of field of view to be magnified, and/or size of resultant magnified field of view, freezing and unfreezing of resultant magnified field of view can be controlled or determined by actuation of the input button 20, an entry via the keypad 18, detection of an additional input pointing object(s) 40 by the touchscreen 16, as well as other input events known in the art. It can also be understood by a person skilled in the art that the processing unit can execute other application programs, computing programs, configuration data, and/or the like for performing other functions not described above.

The magnification of graphical and/or text information displayed on the display screen 26 enhances ease of viewing graphical and/or text information (e.g., text, icons, images, pictures) displayed on the display screen 26. In addition, the magnification of graphical and/or text information displayed on the display screen 26 increases ease at which the user can input instructions via the touchscreen 16. In certain embodiments of the present disclosure, the user can select an icon located within the magnified area. Selection of the icon within the magnified field of view can be performed by actuation of an input button 20 and/or physical contact of a second pointing object onto the touchscreen 16 at a selected location. The functionality to magnify graphical and/or text information displayed on display screen 26 without the pointing object 40 being in direct physical contact with the touchscreen 16 helps to reduce obscuring of the display screen 26 due to physical contact of the pointing object 40 with the overlaying touchscreen 16.

In the foregoing manner, exemplary embodiments of the present disclosure are described with reference to the figures. Although only exemplary embodiments are of the present disclosure are described, the present invention is not to be limited to specific details so described. The scope of the present disclosure is not limited to the exemplary embodiments of the present disclosure provided above. Numerous changes and modifications can be made to the exemplary embodiments without departing from the scope or spirit of the present invention.

The invention claimed is:

1. A user interface method for controlling a magnification event on a display screen of an electronic computing device to which an input device is coupled in response to an input event corresponding to a user, the user interface method comprising:
   determining a plurality of distances, the plurality of distances comprising:
      a user alterable initiation distance defining a first distance from the input device at which a pointing object is first detectable;
      a freezing distance defining a second distance of the pointing object from the input device at which a magnified event on the display screen can be frozen to define a frozen magnified event, the freezing distance different than the initiation distance; and
      an unfreezing distance defining a third distance of the pointing object from the input device at which the frozen magnified event can be unfrozen, the unfreezing distance different than the freezing distance,
      wherein at least one of the freezing distance and the unfreezing distance is user alterable;
   detecting an input event by the input device;
   determining at least one of a plurality of parameters of the input event by way of processing the input event by the electronic computing device, the plurality of parameters comprising a distance of a pointing object from the input device and a speed of displacement of the pointing object towards the input device; and
   automatically selecting a magnification factor, and at least one of a field of view size, and a size of a resultant magnified field of view for the magnification event, the magnification factor, and at least one of the field of view size, and the size of the resultant magnified field of view being determined in correlation to the at least one of the plurality of parameters of the input event.

2. The user interface method as in claim 1, the plurality of parameters of the input event further comprising a direction at which the pointing object is displaced towards the input device and a direction of displacement of the pointing object parallel a plane of the input device.

3. The user interface method as in claim 1, wherein the input device is one of a touchscreen, a touch pad, and at least one proximity sensor.

4. The user interface method as in claim 1, wherein the input event comprises detection of the pointing object in proximity with the input device.

5. The user interface method as in claim 4, wherein the magnification factor for the magnification event increases with corresponding decrease in the distance of the pointing object from the input device.

6. The user interface method as in claim 4, wherein the magnification factor for the magnification event increases with corresponding increase in the speed of displacement of the pointing object towards the input device.

7. The user interface method as in claim 4, wherein at least one of the field of view size and the size of the resultant magnified field of view increases with corresponding decrease in distance of the pointing object from the input device.

8. The user interface method as in claim 4, wherein at least one of the field of view size and the size of the resultant magnified field of view increases with corresponding increase in the speed of displacement of the pointing object towards the input device.

9. The user interface method as in claim 1, further comprising:
  effecting the magnification event on the display screen;
  determining variation of at least one of the plurality of parameters of the input event; and
  varying the magnification factor, and at least one of the field of view size, and the size of the resultant magnified field of view for the magnification event in correlation with the varying at least one of the plurality of parameters of the input event.

10. The user interface method as in claim 9, further comprising:
  freezing the magnification event on the display screen; and
  unfreezing a frozen magnification event on the display screen,
  wherein the freezing of the magnification event on the display screen enhances ease of viewing imagery displayed on the display screen.

11. The user interface method as in claim 10, further comprising:
  generating input signals by a second input device, the second input device being one of an input button and a key of a keypad; and
  automatically selecting the magnification factor, and at least one of the field of view size, the size of the resultant magnified field of view, freezing, and unfreezing of the magnification event at least partially in response to the generated input signals by the second input device.

12. The method of claim 1, wherein each of freezing distance and the unfreezing distance is user alterable.

13. The method of claim 1, further comprising:
  determining a preprogrammed range of scales of magnification; and
  storing the preprogrammed range of scales of magnification in a data storage unit of the electronic computing device,
  wherein selecting the magnification factor comprises selecting a scale of magnification from among the preprogrammed range of scales of magnification.

14. A touchscreen interface method for controlling a magnification event of a display screen of an electronic computing device to which a touchscreen interface is coupled in response to at least one parameter of an input event corresponding to a user using a computer-based system, the touchscreen interface method comprising:
  detecting a pointing object in proximity with a touchscreen;
  determining a plurality of distances, the plurality of distances comprising:
  a user alterable initiation distance defining a first distance from the touchscreen at which a pointing object is first detectable:
  a freezing distance defining a second distance of the pointing object from the touchscreen at which a magnified event on the display screen can be frozen to define a frozen magnified event, the freezing distance different than the initiation distance; and
  an unfreezing distance defining a third distance of the pointing object from the touchscreen at which the frozen magnified event can be unfrozen, the unfreezing distance different than the freezing distance,
  wherein at least one of the freezing distance and the unfreezing distance is user alterable;
    determining at least one of a plurality of parameters of the input event by way of processing the input event by the electronic computing device, the plurality of parameters comprising distance of the pointing object from the touchscreen and speed of displacement of the pointing object towards the touchscreen; and
    automatically selecting a magnification factor, and at least one of a field of view size, and a size of a resultant magnified field of view for the magnification event, the magnification factor, and at least one of the field of view size, and the size of the resultant magnified field of view being determined in correlation to the at least one of the plurality of parameters of the input event.

15. The touchscreen interface method as in claim 14, the plurality of parameters of the input event further comprising a direction at which the pointing object is displaced towards the touchscreen and a direction of displacement of the pointing object parallel a plane of the touchscreen.

16. The touchscreen interface method as in claim 14, wherein the magnification factor for the magnification event increases with corresponding decrease in the distance of the pointing object from the touchscreen.

17. The touchscreen interface method as in claim 14, wherein the magnification factor for the magnification event increases with corresponding increase in the speed of displacement of the pointing object towards the touchscreen.

18. The touchscreen interface method as in claim 14, wherein at least one of the field of view size and the size of the resultant magnified field of view increases with corresponding decrease in distance of the pointing object from the touchscreen.

19. The touchscreen interface method as in claim 14, wherein at least one of the field of view size and the size of the resultant magnified field of view increases with corresponding increase in the speed of displacement of the pointing object towards the touchscreen.

20. The touchscreen interface method as in claim 14, further comprising:
  effecting the magnification event on the display screen;
  determining variation of at least one of the plurality of parameters of the input event by way of processing the input event by the electronic computing device; and
  varying the magnification factor, and at least one of the field of view size, and the size of the resultant magnified field of view for the magnification event in correlation with the varying at least one of the plurality of parameters of the input event.

21. The touchscreen interface method as in claim 20, further comprising:

freezing the magnification event on the display screen; and
unfreezing a frozen magnification event on the display screen,
wherein the freezing of the magnification event on the display screen enhances ease of viewing imagery displayed on the display screen.

22. The touchscreen interface method as in claim 21, further comprising:
generating input signals by a second input device, the second input device being one of an input button and a key of a keypad; and
automatically selecting the magnification factor, and at least one of the field of view size, the size of the resultant magnified field of view, freezing, and unfreezing of the magnification event based at least partially on generated input signals by the second input device.

23. A user interface method for controlling a parameter of a magnification event on a display screen of a computer-based system to which a touchscreen is coupled in response to an input event using a computer-based system corresponding to a user, the user interface method comprising:
determining a plurality of distances, the plurality of distances comprising:
a user alterable initiation distance defining a first distance from the touchscreen at which a pointing object is first detectable;
a freezing distance defining a second distance of the pointing object from the touchscreen at which a magnified event on the display screen can be frozen to define a frozen magnified event, the freezing distance different than the initiation distance; and
an unfreezing distance defining a third distance of the pointing object from the touchscreen at which the frozen magnified event can be unfrozen, the unfreezing distance different than the freezing distance,
wherein at least one of the freezing distance and the unfreezing distance is user alterable;
determining at least one of a plurality of parameters of the input event by way of processing the input event by the computer-based system, the plurality of parameters of the input event comprising distance of the pointing object from the touchscreen, speed of displacement of the pointing object towards the touchscreen, direction of displacement of the pointing object towards the touchscreen, and direction of displacement of the pointing object parallel a plane of the touchscreen; and
correlating at least two parameters of the magnification event to the at least one of the plurality of parameters of the input event, the at least two parameters of the magnification event being selected from a group comprising a magnification factor and at least one of a field of view size, and a size of a resultant magnified field of view of the magnification event.

24. An electronic device comprising:
a display screen;
a proximity sensor for detecting a pointing object in proximity thereto and generating input signals determining a plurality of distances, the plurality of distances comprising:
a user alterable initiation distance defining a first distance from the proximity sensor at which a pointing object is first detectable;
a freezing distance defining a second distance of the pointing object from the proximity sensor at which a magnified event on the can be frozen to define a frozen magnified event, the freezing distance different than the initiation distance; and
an unfreezing distance defining a third distance of the pointing object from the proximity sensor at which the frozen magnified event can be unfrozen, the unfreezing distance different than the freezing distance,
wherein at least one of the freezing distance and the unfreezing distance is user alterable;
the input signals when processed by way of the electronic device providing information on at least one of distance of the pointing object from the proximity sensor, speed of displacement of the pointing object towards the proximity sensor, direction of displacement of the pointing object towards the proximity sensor, and direction of displacement of the pointing object parallel a plane of the proximity sensor; and
the display screen in signal communication with the proximity sensor for effecting a magnification event, the magnification event having at least two parameters that corresponds to at least one of the distance of the of the pointing object from the proximity sensor, the speed of displacement of the pointing object towards the proximity sensor, the direction of displacement of the pointing object towards the proximity sensor, and the direction of displacement of the pointing object parallel the plane of the proximity sensor,
wherein the at least two parameters are selected from a group comprising a scale of magnification of the magnification event, and at least one of a size of field of view for the magnification event, and a size of a magnified field of view.

25. The electronic device as in claim 24, wherein the proximity sensor is a touchscreen.

26. The electronic device as in claim 24, wherein the scale of magnification of the magnification event increases with decreasing distance of the pointing object from the proximity sensor.

27. The electronic device as in claim 24, wherein the scale of magnification of the magnification event increases with increasing speed of displacement of the pointing object towards the proximity sensor.

28. The electronic device as in claim 24, wherein at least one of the size of field of view for the magnification event and the size of the magnified field of view increases with decreasing distances of the pointing object from the proximity sensor.

29. The electronic device as in claim 24, wherein at least one of the size of field of view for the magnification event and the size of the magnified field of view increases with increasing speed of displacement of the pointing object towards the proximity sensor.

30. The electronic device as in claim 24, further comprising:
at least one input device in signal communication with the display screen, the at least one input device being actuable for generating signals for controlling-the scale of magnification of the magnification event, and at least one of the size of field of view for the magnification event, and the size of a magnified field of view displayed on the display screen.

31. An electronic device comprising:
a touchscreen capable of detecting a pointing object in proximity thereto for generating input signals;
a processor for receiving input signals from the touchscreen and processing the input signals by way of an electronic device for determining a plurality of distances, the plurality of distances comprising:

a user alterable initiation distance defining a first distance from the touchscreen at which a pointing object is first detectable;

a freezing distance defining a second distance of the pointing object from the touchscreen at which a magnified event on the can be frozen to define a frozen magnified event, the freezing distance different than the initiation distance; and an unfreezing distance defining a third distance of the pointing object from the touchscreen at which the frozen magnified event can be unfrozen, the unfreezing distance different than the freezing distance, wherein at least one of the freezing distance and the unfreezing distance is user alterable;

the processor determining at least one of distance of the pointing object from the touchscreen and speed of displacement of the pointing object towards the touchscreen; and a display screen for effecting a magnification event, the magnification event having at least two parameters that correlates to at least one of the distance of the pointing object from the touchscreen and the speed of displacement of the pointing object towards the touchscreen, the at least two parameters being a scale of magnification of the magnification event, and at least one of a size of field of view for the magnification event, and a size of a magnified field of view.

32. An input device coupled to an electronic computing device comprising:

at least one sensor for detecting an input event in response to a user and generating input signals; and a module for processing the input signals by the electronic computing device to determine at least one of a plurality of parameters of the input event, the plurality of parameters comprising a user alterable initiation distance defining a first distance from the input device at which a pointing object is first detectable;

a freezing distance defining a second distance of the pointing object from the input device at which a magnified event on the can be frozen to define a frozen magnified event, the freezing distance different than the initiation distance; and an unfreezing distance defining a third distance of the pointing object from the input device at which the frozen magnified event can be unfrozen, the unfreezing distance different than the freezing distance, wherein at least one of the freezing distance and the unfreezing distance is user alterable;

a distance of the pointing object from the at least one sensor, a speed of displacement of the pointing object towards the at least one sensor, a direction of displacement of the pointing object towards the at least one sensor, and a direction of displacement of the pointing object relative the at least one sensor, the module further for correlating the at least one of the plurality of parameters of the input event with at least two of a plurality of parameters of a magnification event performed by a display screen, the plurality of parameters of the magnification event comprising a scale of magnification, and at least one of a size of field of view for the magnification event, and a size of a magnified field of view.

* * * * *